United States Patent

[11] 3,568,082

[72] Inventor Tore Torstensson Fjallbrant Fjaras, Sweden
[21] Appl. No. 757,057
[22] Filed Sept. 3, 1968
[45] Patented Mar. 2, 1971
[73] Assignee Telefonaktiebolaget LM Ericsson Stockholm, Sweden
[32] Priority Sept. 11, 1967
[33] Sweden
[31] 12526/67

[54] ACTIVE CRYSTAL FILTER WITH A TRANSFER FUNCTION OF A WANTED DEGREE
7 Claims, 5 Drawing Figs.

[52] U.S. Cl. .......... 330/31, 330/103, 330/174, 333/72
[51] Int. Cl. .......... H03f 3/04
[50] Field of Search .......... 330/31, 103, 174; 333/71, 72, 80

[56] References Cited

UNITED STATES PATENTS 3,064,213 11/1962 Mason .......... 331/71

*Primary Examiner*—John Kominski
*Attorney*—Hane & Baxley

ABSTRACT: An active band pass filter includes a plurality of serially connected crystals which connect the input of the filter to an emitter-follower amplifier. A first plurality of resistors connected at alternate junctions of the crystals to the output of the amplifier and a second plurality of resistors connect the remaining junctions of the crystals to a signal level means which has a level different from the output of the amplifier.

INVENTOR
TORE TORSTENSSON FJÄLLBRANT
BY Hane and Baxley
ATTORNEYS

INVENTOR
TORE TORSTENSSON FJÄLLBRANT
BY Hane and Baxley
ATTORNEYS

ACTIVE CRYSTAL FILTER WITH A TRANSFER FUNCTION OF A WANTED DEGREE

When constructing band-pass filters, crystals can be used as frequency selective elements. A crystal is equivalent to a series resonant circuit with a very stable resonance frequency and a very high Q-value, i.e. the resonant circuit is a very narrow band circuit. Furthermore a crystal usually requires much less space than the corresponding resonant circuit consisting of an inductor and a capacitor. The disadvantage of a filter consisting of crystals is however that in order to obtain a filter of a certain degree and desired transfer function, it is required that the individual crystals have different resonant frequencies. Furthermore a considerably larger number of resonant circuits is required than in corresponding filters consisting of coils and capacitors.

An object of the present invention is to provide a crystal filter, in which all crystals can have the same resonant frequency and which only requires a number of crystals corresponding to the degree of the filter. The filter is then characterized in that it comprises partly an input and an output circuit each provided with one input terminal and a number of output terminals, the input terminal of the input circuit constituting the signal input terminal of the filter and an output terminal of the output circuit constituting the signal output terminal of the filter. The circuits are built up in such a way that a signal is obtained at each of the output terminals, the value of the signal constituting a certain portion of the value of the input signal in the respective circuit. The output circuit comprises an electronic connecting element, the control electrode of which is the input terminal of the circuit and in which one of the other electrodes constitutes an output terminal of the output circuit, and which element causes the output circuit to have a high input impedance and low output impedances. There is also included a number of crystals, which constitute series resonance circuits and are connected in series between the input terminal of the output circuit and an output terminal in said input circuit, besides which the terminal point, turned to the output circuit, of crystals of even order, counted from the output circuit, is via a resistance connected to the output terminal of the output circuit which constitutes the signal output terminal of the filter and the corresponding terminal point of crystals of odd order is via resistance connected to one of said output terminals.

Figure 1:
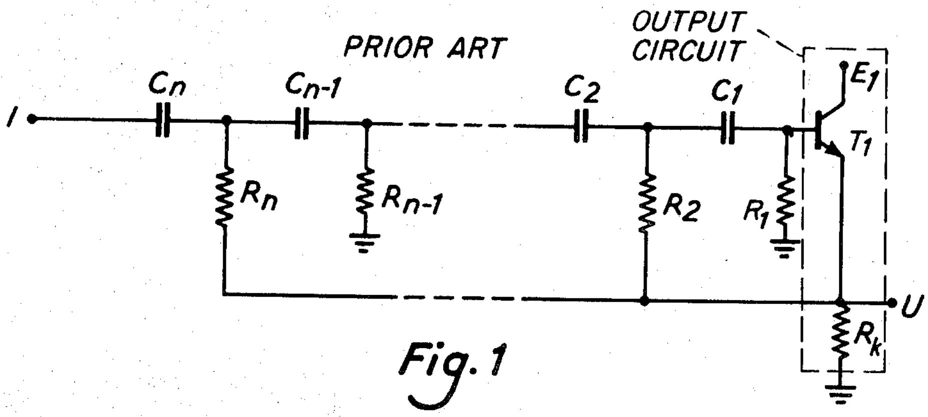

The filter will be described more in detail with reference to the accompanying drawing, in which FIG. 1 shows a known high pass filter and FIGS. 2—5 show four different embodiments of the band-pass filter according to the invention.

FIG. 1 shows an active high pass filter of the kind described in the Swedish Patent ..... (Pat. application No. 1145/67). The filter consists of a number of capacitors C1–C*n*, connected in series between the base of a transistor T1 and the input terminal I of the filter. Each of the resistors R1–R*n* has one terminal connected to a junction point between the capacitors. The resistors with odd numbers are connected to ground and those with even numbers are connected to the emitter of the transistor T1, constituting the output terminal U of the filter. This filter realizes a transfer function of degree *n*, which is described more in detail in the above mentioned patent.

Figure 2:
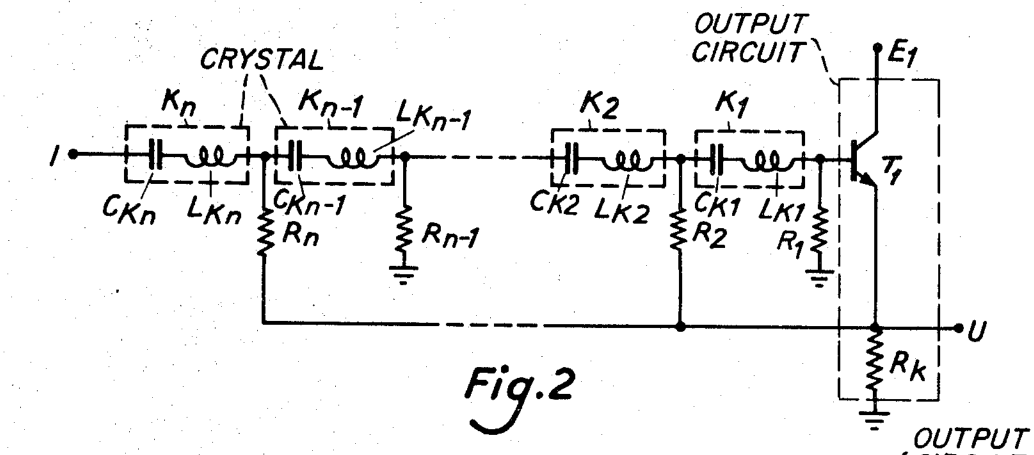

FIG. 2 shows a band-pass filter according to the invention. This is achieved when realizing the transfer function obtained when a high pass to band-pass transformation of the transfer function of the filter according to FIG. 1 is carried out in a conventional way, i.e. when the complex frequency variable $1/s$ is exchanged for the expression $$\frac{\frac{1}{s}+\frac{1}{2},}{f_0/s}$$

$f_0$ being the center frequency of the band-pass filter. As a result of this frequency transformation the capacitors of the prior high pass filter are ffor a capacitor and an inductor in series to form a series resonant circuit having a resonant frequency $f_0$. This can be seen in FIG. 2 where the components in common with FIG. 1 have the same reference characters and each of the capacitors C1–C*n* has been replaced by a resonant circuit consisting of a capacitor C*K*1–C*K n*and an inductor L*K 1*–*LKn*. Thus, a band-pass filter only comprising series resonant circuits is obtained which can be replaced by crystals. This has been indicated by means of the dashed line rectangles Kl–K*n*. A band-pass filter is thus obtained, the transfer function of which has the same degree as the number of crystals included.

Figure 3:
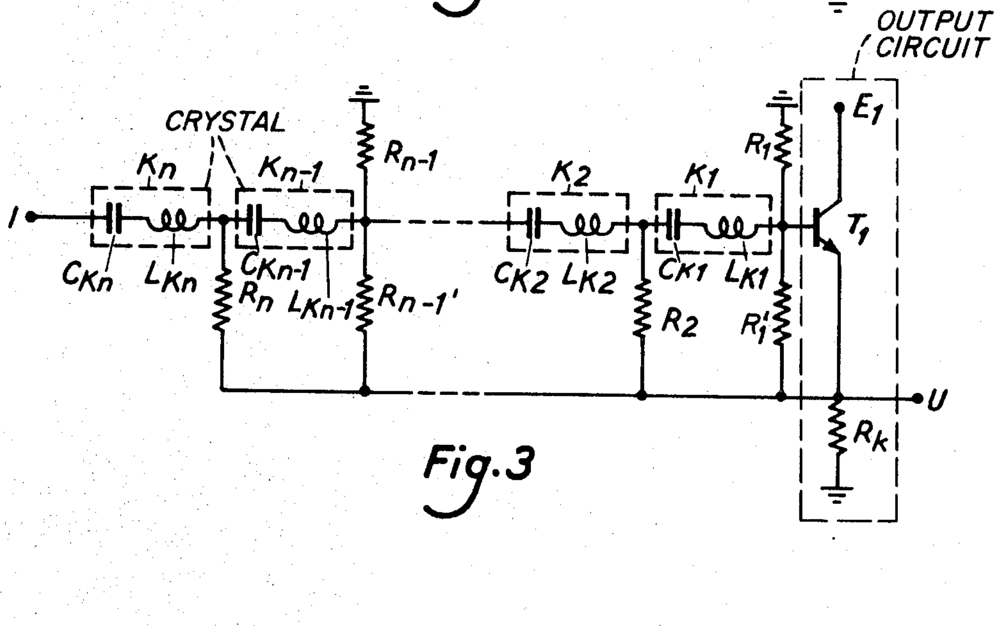

FIG. 3 shows a modification of the filter according to FIG. 2, components common to the FIGS. having the same references. As appears from FIG. 3 a resistor has been connected between the function points to which resistors with odd numbers are connected and to the output terminal U of the filter, which resistances are labeled $R_1 - R_n{-}_1$. This modification has the effect that the component values of the elements in the filter can be made the same order of magnitude, which is very important from the manufacturing point of view.

Figure 4:
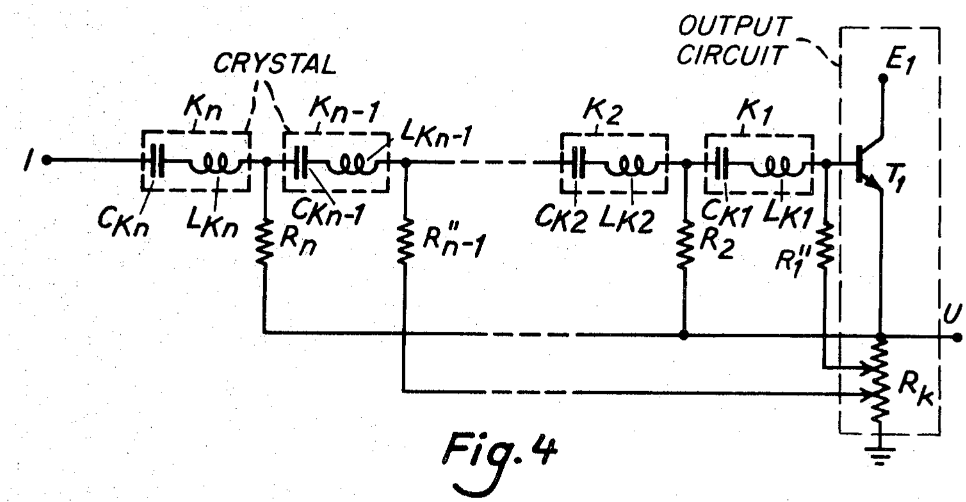

FIG. 4 shows another modification of the filter according to FIG. 2 causing the component values of the passive element of the filter in FIG. 2 to be of the same order of magnitude. As can be seen the resistors with odd numbers have been connected to points on the emitter resistance R*k* of the transistor T2 instead of to ground. Otherwise the filters are identical and have the same references.

Figure 5:
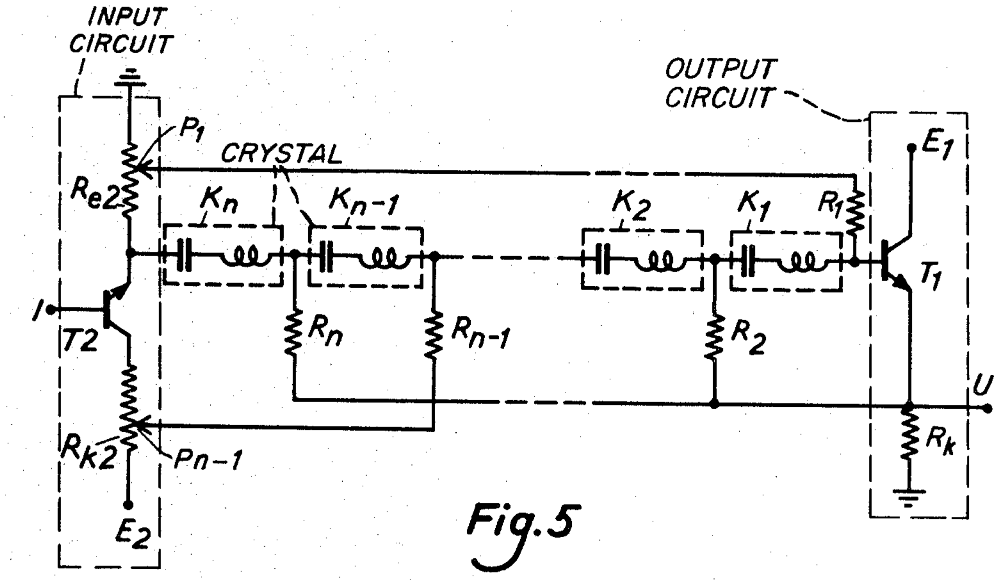

FIG. 5 shows a further development of the filter according to FIG. 2, identical components having the same references. As appears from FIG. 5, signals are fed via the collector-emitter circuit of a transistor T2, to the base of which the input signal of the filter is supplied. The input terminal I is then connected to the emitter of the transistor T2, and the resistors which in FIG. 2 are connected to ground have been connected to points (P1)–(P*n*–1) of the collector resistor R*k*2 and the emitter resistance R*e*2 of the transistor. It may hereby be achieved that the signals which are fed from the point I and the points (P1)–(P*n*–1) to the impedance ladder cancel each other at certain frequencies, around which a high attenuation is obtained and the numerator of the transfer function has transmission zeros at these frequencies.

I claim:

1. An active band-pass filter having an *n*-degree transfer function comprising *n* crystals, connected in series, each of said *n* crystals operating as a series resonant circuit with the same resonant frequency, signal input means connected to one end of said serially connected crystals, a signal amplifier having a common terminal, an input terminal and an output terminal, means for applying an operating voltage to said common terminal, means for connecting the input terminal of said signal amplifier to the other end of said serially connected crystals, an output resistor connecting the output terminal of said signal amplifier to ground, a plurality of first resistors, each of said first resistors having one terminal connected to a different one of alternate junctions of said serially connected crystals starting with such junction nearest said other end of said serially connected crystals, respectively, the other terminal of each of said first resistors being connected to said output terminal of said signal amplifier, a plurality of second resistors, each of said second resistors having one terminal connected to a different one of the remaining junctions of said serially connected crystals and said other end of said serially connected crystals, respectively, and means for maintaining the other terminals of said second resistors at at least one signal level different from the signal level of the output terminal of said signal amplifier.

2. The active band-pass filter of claim 1 wherein the other terminal of each of said second resistors is maintained at the same constant DC voltage.

3. The active band-pass filter of claim 2 wherein the other terminal of each of said second resistors is grounded.

4. The active band-pass filter of claim 2 and further comprising a third plurality of resistors, means for connecting one terminal of each of said third resistors to a different one of each of said one terminals of said second resistors, respectively and means for maintaining the other terminal of each of said third resistors at the same constant DC voltage.

5. The active band-pass filter of claim 3 and further comprising a third plurality of resistors, means for connecting one terminal of each of said third resistors to a different one of each of said one terminal of said second resistors, respectively, and means for connecting the other terminal of each of said third resistors to ground.

6. The active band-pass filter of claim 1 wherein said output resistor includes a plurality of different tapping points between the terminals thereof, and further comprising means for connecting said other terminal of each of said second resistors to a different one of said tapping points.

7. The active band-pass filter of claim 1 and further comprising a second signal amplifier having an input terminal and first and second output terminals, a two-terminal source of operating potential, a first tapped resistor connecting the first output terminal of said second signal amplifier to one terminal of said source of operating potential, a second tapped resistor connecting the second output terminal of said second signal amplifier to the other terminal of said source of operating potential, and means for connecting the other terminal of each of said second resistors to different taps of said first and second tapped resistors.